United States Patent [19]

DeSantis et al.

[11] 4,424,185
[45] Jan. 3, 1984

[54] PART PICK-UP MECHANISM FOR POWDER COMPACTING PRESSES AND THE LIKE

[75] Inventors: Raymond P. DeSantis, Troy; Herbert J. Puffer, Jr., Garden City, both of Mich.

[73] Assignee: PTX-Pentronix, Inc., Lincoln Park, Mich.

[21] Appl. No.: 244,605

[22] Filed: Mar. 17, 1981

[51] Int. Cl.³ .......................... B29C 7/00; B29C 3/00
[52] U.S. Cl. ..................................... 264/334; 425/78; 425/139; 425/422
[58] Field of Search ............... 264/334; 425/309, 422, 425/313, 305.1, 78, 139, 437

[56] References Cited

U.S. PATENT DOCUMENTS

| | | | |
|---|---|---|---|
| 1,243,318 | 10/1917 | McLaren | 264/334 |
| 1,916,798 | 7/1933 | Hottel | 264/334 |
| 2,133,737 | 10/1938 | Blackwell | 425/309 |
| 2,994,103 | 8/1961 | Schaich | 425/313 |
| 3,555,621 | 4/1968 | Hara | 425/305.1 |
| 3,561,054 | 2/1971 | Smith | 425/78 |
| 3,561,056 | 2/1971 | Smith et al. | 425/78 |
| 3,645,658 | 2/1972 | DeTroyer | 425/78 |
| 4,207,051 | 6/1980 | Wright et al. | 425/556 |
| 4,239,476 | 12/1980 | Somberg | 425/556 |
| 4,299,371 | 4/1981 | Duga | 425/556 |

FOREIGN PATENT DOCUMENTS 2112972 6/1972 France ............................. 425/78

Primary Examiner—Jay H. Woo
Attorney, Agent, or Firm—Hauke and Patalidis

[57] ABSTRACT

A part pick-up head for transferring a part from the ejection station of an apparatus, such as a powder compacting apparatus, to a discharge station. The pick-up head is internally provided with a pair of reciprocating jaws, actuated by pressurized fluid such as compressed air, and arranged to clamp the part at the ejection station with enough pressure to hold the part securely for transfer to the discharge station. At the discharge station, the clamping jaws are spread apart by a return spring when fluid pressure is released. Auxiliary holding means in the form of suction ports above the part may be disposed in the pick-up head, and the pick-up head may also incorporate suction orifices sweeping clean the surface of the die plate over which the pick-up head travels from the ejection station to the discharge station.

12 Claims, 11 Drawing Figures

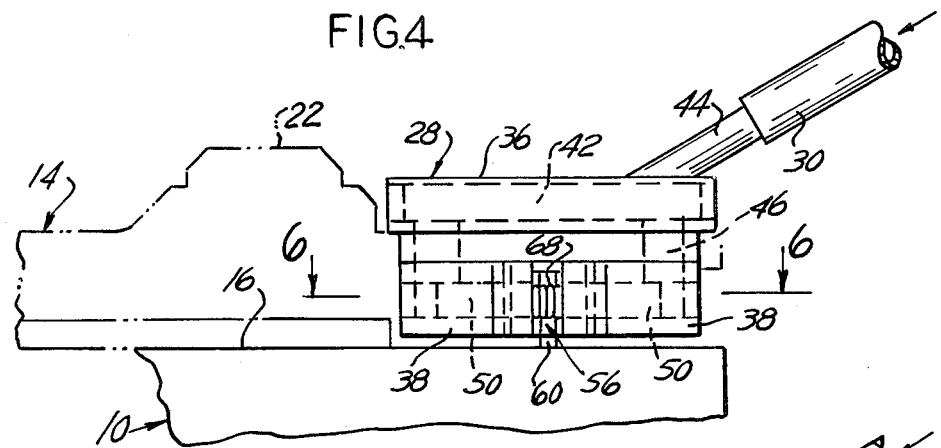
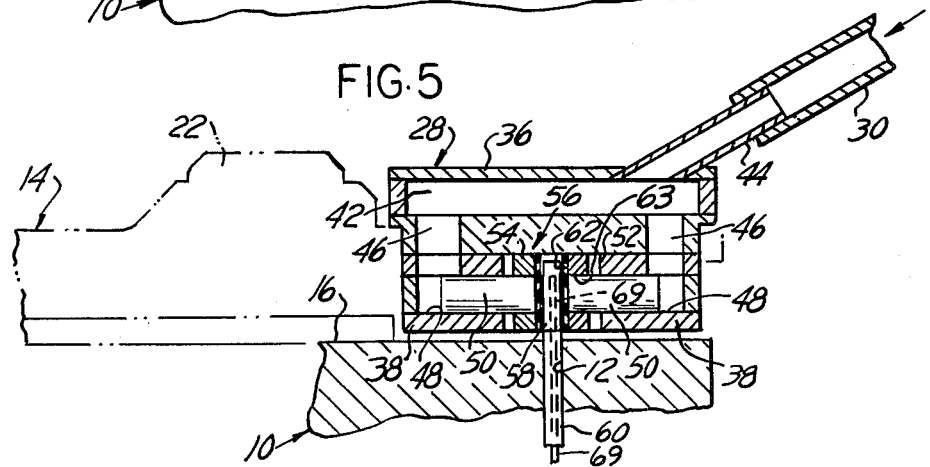
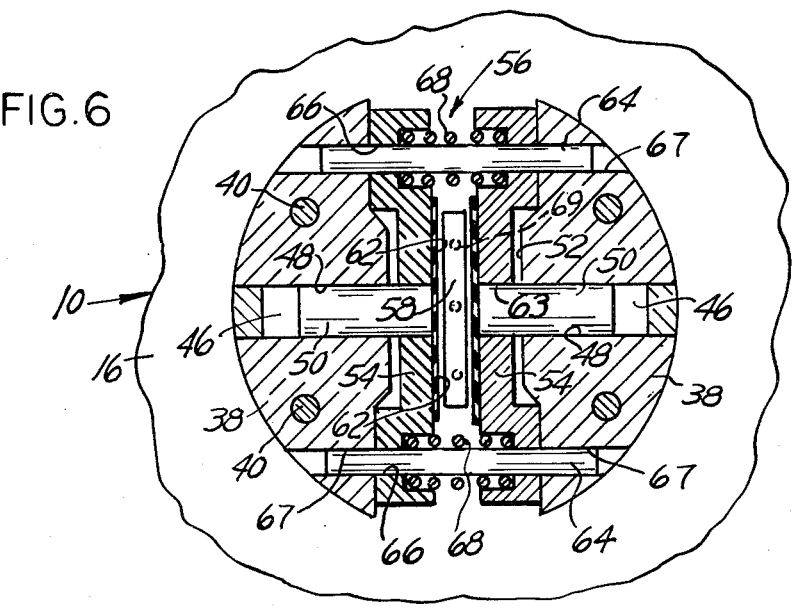

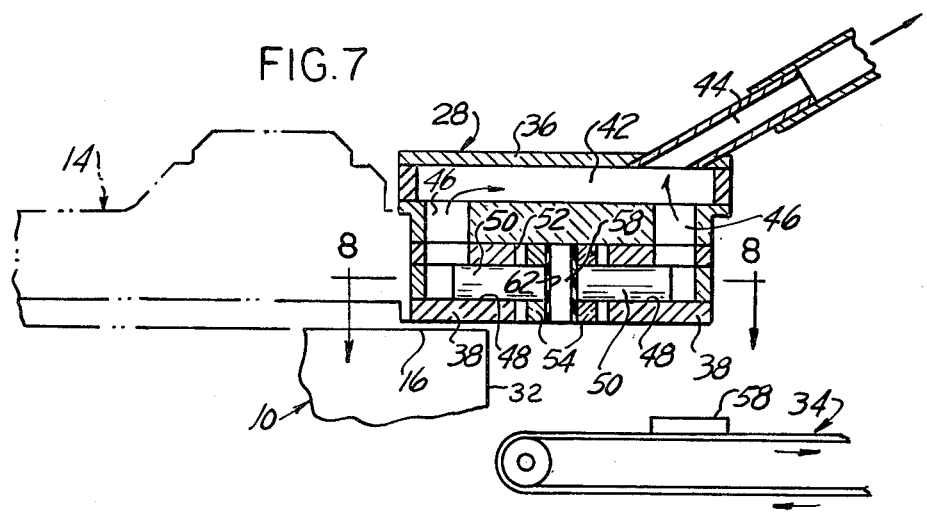
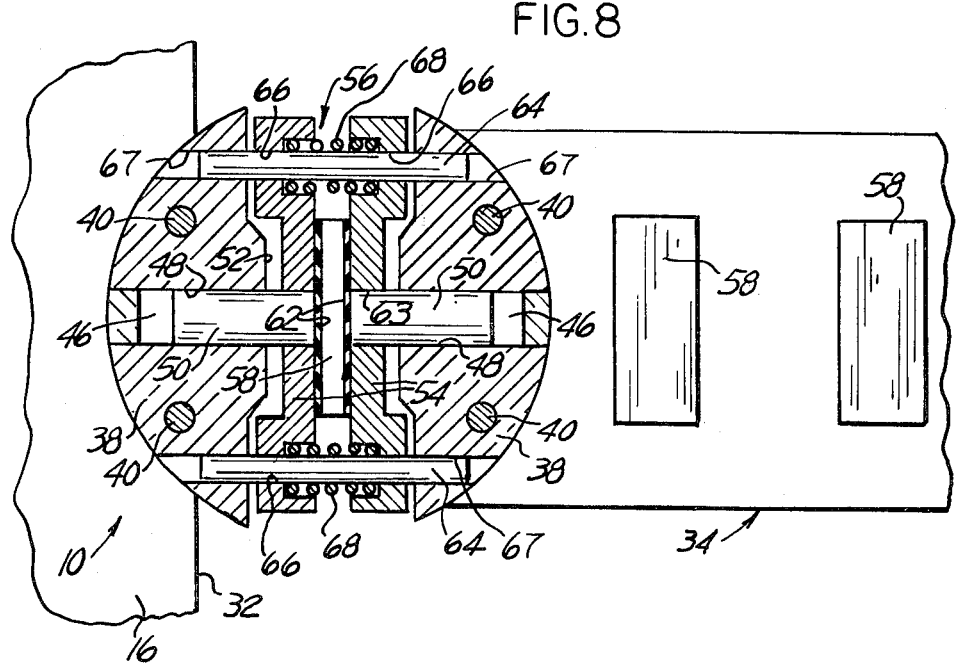

PART PICK-UP MECHANISM FOR POWDER COMPACTING PRESSES AND THE LIKE

REFERENCE TO RELATED APPLICATIONS

The invention forming the subject matter of the present application is related in part to U.S. Pat. Nos. 3,328,840, 3,645,658, 3,715,796 and 3,876,352, relating generally to powder compacting presses and more particularly to pick-up mechanisms for articles ejected from the die cavity of a powder compacting apparatus, said Letters Patent being assigned to the same assignee as the present application.

BACKGROUND OF THE INVENTION

1. Field of the Invention

The present invention relates to a pick-up and discharge mechanism for presses and like apparatus, and more particularly for powder compacting presses.

2. Description of the Prior Art

In manufacturing apparatus, such as punch presses, powder compacting presses and the like, which manufacture relatively small parts at a high rate production, problems have been encountered relating to ejecting a finished part from the die, picking up the finished parts and transporting and discharging them in an appropriate location either proximate to the machine or remote therefrom. For efficient manufacturing operations, the finished parts must be discharged at the same rate that the press operates and in synchronism with the various work cycles of the press or other apparatus.

The problem presented by picking up finished articles and discharging the articles in an appropriate location is particularly acute in the powder compacting technology where the powder compacted article, ejected from the die in its "green" form, is relatively fragile and must be handled with care during ejection, pick-up and transfer to a discharge station.

It has been the practice in powder compacting presses, as disclosed in the aforementioned Letters Patent, to dispose a suction head over the die cavities after the last compacting stroke, and to eject the finished compacted parts from the die cavities into the suction head where they are retained by means of a suction force during transfer to a discharge station. At the discharge station, the suction force is cut off, thus causing the compacted parts to drop in an appropriate receptacle or on a conveyor. In U.S. Pat. No. 3,645,658, there is disclosed a pick-up and transfer mechanism wherein, simultaneously with cutting off the suction force at the discharge station, a gentle blast of pressurized air is applied to the compacted parts to aid in discharging the parts from the pick-up head. In U.S. Pat. No. 2,876,352, there is disclosed a collecting mechanism for compacted parts which suctions the parts from the pick-up head to an aspirator in which the parts are transferred to a conduit in which they are carried to a remote location by a stream of pressurized air.

Although such finished part pick-up and conveying mechanisms have been found to be effective for picking up parts ejected from the die cavity or cavities of a powder compacting apparatus when the compacted articles or parts are relatively small, light, and of a relatively short height, they are not quite as effective when the finished part is relatively massive, has considerable height, is ejected from the die cavity such as to be presented to the pick-up head along its height axis, and when the part has to be stripped from core rods during ejection and pick-up.

SUMMARY OF THE PRESENT INVENTION

The present invention provides a novel mechanical part pick-up mechanism for parts or articles ejected from the die cavity of a press and more particularly for compacted parts ejected from a powder compacting press die cavity, which is capable of mechanically grasping the part after ejection from the die cavity and of transferring the part to a discharge station, where it is released, in powder compacting apparatus of the type disclosed in the aforementioned Letters Patent, wherein the part pick-up head assembly is supported, together with a powder dispenser and an anvil against which the parts are compacted, on a work station positioner automatically linearly or arcuately displaced over the die cavity in timed relationship with the diverse function effected by the apparatus, from filling of the die cavity with powder to ejection of the finished part from the die cavity. As the part is clampingly held in the pick-up head of the invention between a pair of reciprocable jaws, stripping of the part from projecting cores may be effected without damaging the part simply by retracting the cores, and the part is subsequently conveyed to the discharge station without any risk of the part becoming loose and dropping between the pick-up location and the discharge station location. Additionally, for certain applications, the present invention provides an auxiliary suction arrangement aiding in picking up the part and holding it during transfer to the discharge station, and for exhausting through the pick-up head a gentle flow of pressurized air at the discharge station for aiding in ejecting the part from the pick-up head. Furthermore, the invention contemplates providing the pick-up head with a plurality of inlet ports in its bottom surface, the inlet ports being connected to a suction source for suctioning dust and debris from the surface of the die plate and from the die cavity while the pick-up head is displaced over the die cavity and over the die plate surface from the part pick-up position to the part discharge position.

Further objects and additional advantages of the invention will become apparent to those skilled in the art when the following detailed description of the preferred modes for practicing the invention is read in conjunction with the accompanying drawings wherein like numerals refer to like or equivalent parts and in which:

BRIEF DESCRIPTION OF THE DRAWINGS

FIG. 4 is a side elevation view thereof, with part of the positioner assembly shown in phantom lines;

FIG. 5 is a section along line 5—5 of FIG. 3;

FIG. 6 is a section along line 6—6 of FIG. 4;

FIG. 7 is a view similar to FIG. 5 but showing the part pick-up head of the invention at the part discharge station;

FIG. 8 is a section along line 8—8 of FIG. 7;

DETAILED DESCRIPTION OF THE PREFERRED EMBODIMENTS

Figure 1:
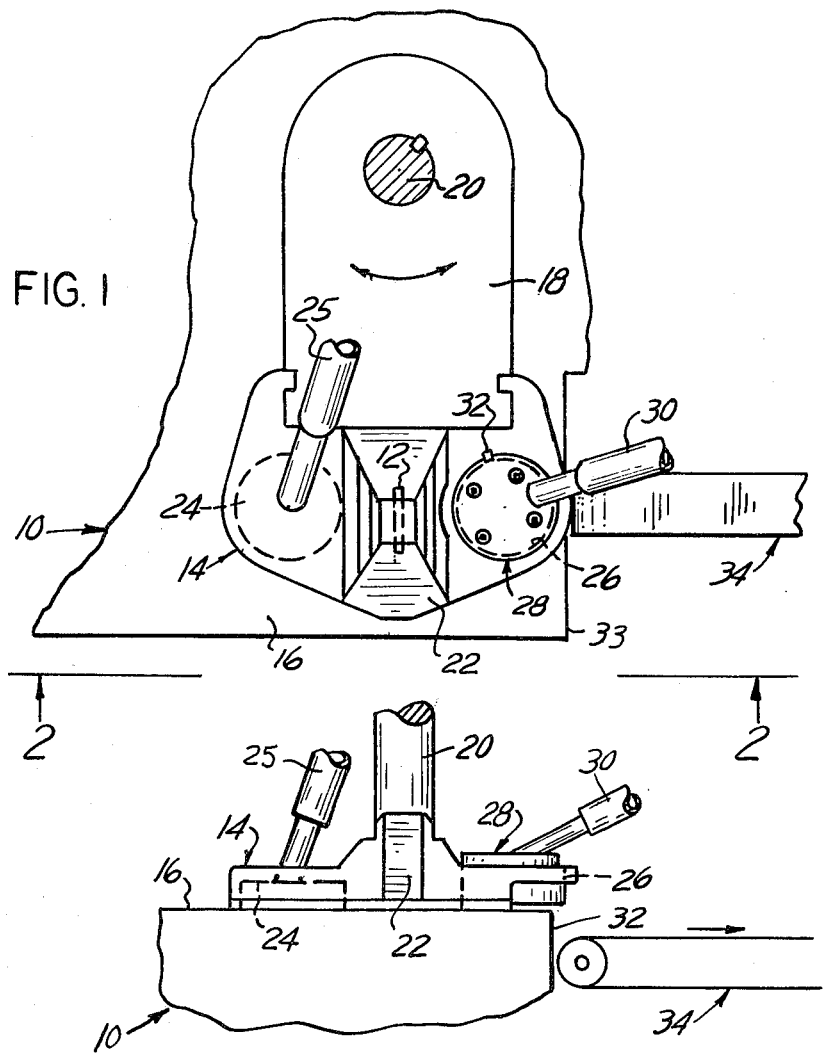
FIG. 1 is a schematic top plan view of an example of the positioner assembly of a powder compacting apparatus comprising the part pick-up head of the present invention.
Figure 2:
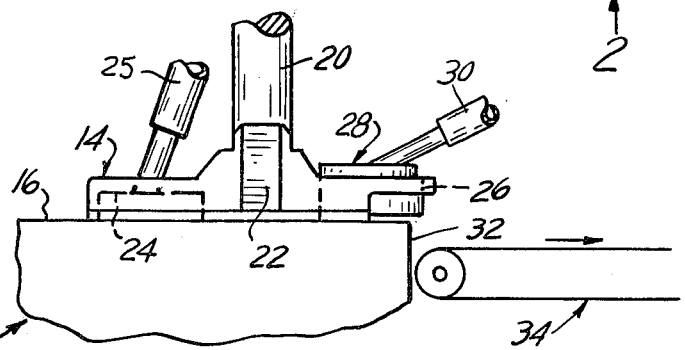
FIG. 2 is an elevational view thereof from line 2—2 of FIG. 1.
Figure 3:
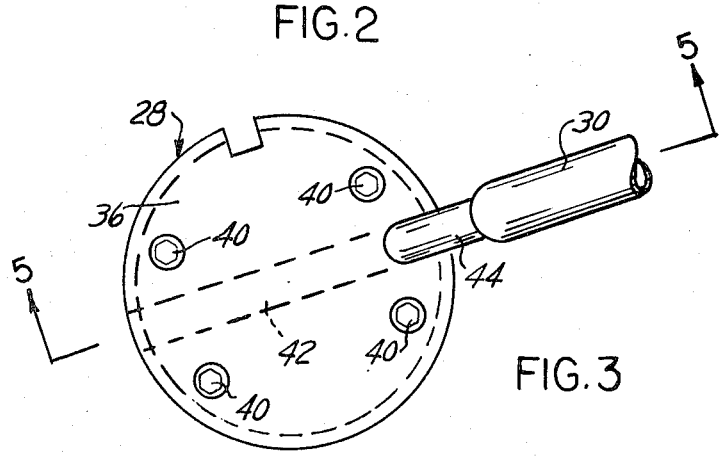
FIG. 3 is a top plan view of the part pick-up head according to the present invention.

Referring to the drawings with particular reference to FIGS. 1 and 2, wherein there is illustrated only the portion of a powder compacting press helpful in providing an understanding of the present invention, the powder compacting press has a table 10 having an aperture, not shown, in which is mounted a die having a vertical bore, defining a die cavity 12 in which is disposed a reciprocating punch, not shown. A work station positioner 14 is arcuately displaceable over the table 10 in sliding engagement with the table and die upper surface 16. The work station positioner 14 is attached to the end of a positioner arm 18 arcuately driven by a drive shaft 20 whose oscillation motion around its longitudinal axis is provided by drive means, not shown, forming part of the press drive mechanism, in appropriate timed relationship with reciprocation of the punch reciprocably disposed in the die. The work station positioner 14 is in the form of, in the example of structure illustrated, a block having an anvil portion 22 provided with a lower surface positionable over the die cavity 12 for compacting an article against the anvil lower surface. A recess is formed in the lower surface of the positioner block 14, the recess defining a powder dispenser 24 placed in communication with a supply of powder material by means of a flexible tube 25. The positioner block 14 is further provided with an opening 26 in which is mounted a part or article pick-up head 28, according to the present invention, connected to a source of fluid pressure such as compressed air by means of a flexible tubing 30. The part pick-up head 28 is located in the opening 26 by a key and keyway arrangement 32, FIG. 1, and is held in the opening 26 by appropriate convenient means such as, for example, being press-fitted therein, or held by set screws or by spring clips, not shown.

The sequence of steps for compacting an article from powder material consists in first disposing the positioner block 14 in a position placing the powder dispenser 24 over the die cavity 12 for filling the die cavity with an appropriate volume of powder material, the punch in the die cavity being retracted to an appropriate fill position. The positioner block 14 is subsequently arcuately displaced by the oscillating drive shaft 20 to the position, shown at FIG. 1, placing the anvil 22 over the die cavity 12. The punch is reciprocated in the die bore upwardly to an appropriate position, determined by the setting of the press mechanism, for compacting an article against the surface of the anvil 22. Subsequently thereto, the positioner block 14 is arcuately displaced to a position placing the pick-up head 28 over the die cavity 12. The punch is further reciprocated upwardly such as to eject the compacted article or part from the die cavity 12 into the pick-up head 28 for holding of the compacted article by the grasping mechanism in the pick-up head 28. Subsequently thereto, the positioner block 14 is arcuately displaced over the table 12 to the position placing the powder dispenser 24 over the die cavity 12. The pick-up head 28 is thus disposed partly over the edge 33 of the table 10, and the article grasping mechanism in the pick-up head 28 is released, with the result that the compacted article is dropped in an appropriate container or alternatively, as illustrated, on a conveyor 34 conveying the compacted article to an appropriate remote location for collecting the compacted articles.

Referring now to FIGS. 3–6, the part pick-up head 28, according to the present invention, is in the form of a cylindrical housing consisting of a top or head portion 36 under which is fastened a pair of symmetrically disposed blocks 38 held by screws or bolts 40. A passageway 42 is formed in the head portion 36, the passageway 42 being placed in communication with the air hose 30 by a tubular member 44. The passageway 42 communicates at each end with a vertically disposed channel 46, each channel 46 leading into a horizontal bore 48, each disposed in one of the blocks 38, the two bores 48 having a common longitudinal axis. A rod 50 is reciprocably disposed in each bore 48. Each rod 50 has an end projecting from the internal face 52 of the corresponding block 38 on which is fastened one of a pair of opposed jaw bars 54 forming a clamping mechanism 56 for a compacted part or article 58, when the compacted article is ejected from the die cavity 12, FIG. 5, as a result of an upward motion of the punch 60. The opposed faces of the jaw bars 54 are preferably provided with a layer of elastomeric material, as shown at 62, for avoiding marring the compacted article, the elastomeric layer 62 being made of, for example, rubber, a polyurethane or other convenient elastomeric material.

The jaw bars 54 are each fastened to the end of one of the rods 50 by being provided with an appropriate aperture 63 in which the end of the rod 50 is held either by press-fitting or by means of an appropriate adhesive. The jaw bars 54 are constantly held in mutual parallel alignment by means of a pair of alignment pins 64, disposed parallel to the reciprocable rods 50, passing through aligned apertures 66 each formed through one of the jaw bars 54 proximate each end thereof, a compressed coil spring 68 being disposed around each alignment pin 64 for normally urging the jaw bars 54 away from each other. The alignment pins 64 are secured in aligned bores 67 formed in the blocks 38.

When pressurized fluid, such as compressed air, supplied through the hose 30 to the passageway 42 via the tubular fitting 44, is introduced into the bores 48, defining each a cylinder for a rod 50 acting as a piston member, through the channels 46, the rods 50 are reciprocated in the direction causing the jaw bars 54 to move towards each other, thus grasping the compacted article 58 expelled from the die cavity 12 as a result of the ejecting upward motion of the punch 60. The jaw bars 54 are able to float in the space between the internal faces 52 of the blocks 38 when grasping the article 58, such that the article when ejected from the die cavity into the pick-up head 28, needs not be centrally located between the jaw bars. Because the compacted article 58 is sturdily held in the clamping mechanism 56, compacted articles through which apertures or passageways are provided by means of core rods 69, FIGS. 5 and 6, may be easily stripped from the core rods 69 by displacing the core rods downwardly, after the compacted article has been ejected from the die cavity 12.

After the article 58 has been securely clamped between the jaw bars 54 of the clamping mechanism 56, as previously described, subsequent motion of the positioner assembly 14, FIGS. 1–2, positions the powder dispenser 24 over the die cavity 12 for filling of the die cavity 12 with powder. The pick-up head 28 is simultaneously positioned, as shown at FIGS. 7-8, over the edge 32 of the table 10. After the pick-up head 28 has been positioned over the edge 32 of the table 10, release of the air pressure from behind the rods 50 causes the jaw bars 54 to be returned to their rest position under the action of the return springs 68, thus freeing the compacted article 58 and allowing it to drop in an appropriate container, not shown, or on the top of the belt of the conveyor 34.

As powder compacted articles in their "green" state, before sintering, are relatively fragile, very little air pressure is used for actuating the grasping mechanism 56. Only enough air pressure is used to counterbalance the biasing effect of the return springs 68, to overcome adhesion forces between the article 58 and the punch end face and to hold the article 58 for conveying to the discharge station over the edge 32 of the table 10 or, alternatively, to an appropriate discharge aperture in the table, not shown.

The diverse elements forming the pick-up head assembly 28 of the invention may be made of any convenient material such as aluminum or aluminum alloy, steel or plastic. Although the alignment pins 64 and the piston rods 50 may be made of steel rods, they are preferably made of rods of polymerized formaldehyde sold under the trademark "Delrin" by E. I. DuPont DeCo. of Wilmington, Del.

Figure 9:
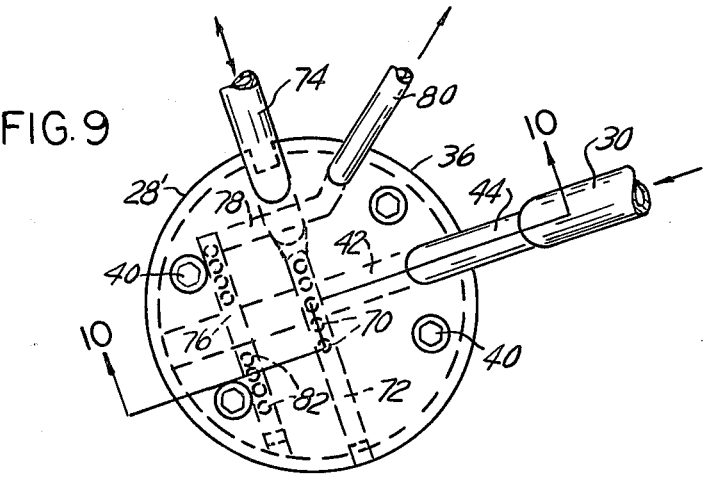
FIG. 9 is a top plan view of a modification thereof.
Figure 10:
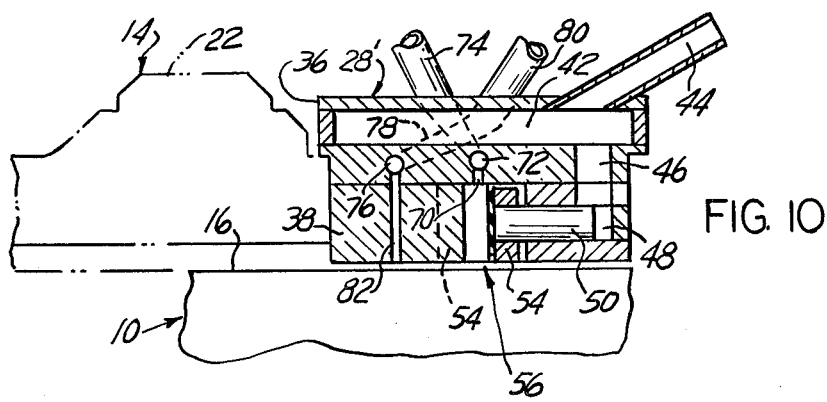
FIG. 10 is a sectional view along line 10—10 of FIG. 9.

As illustrated at FIGS. 9-10, the present invention further contemplates providing a part pick-up head 28', according to the present invention, with auxiliary suction pick-up means in the form of a plurality of orifices 70 disposed in a row above the compacted article being gripped between the jaw bars 54 of the mechanical pick-up mechanism 56. The orifices 70, disposed on the bottom of the head portion 36 of the assembly, communicate with a manifold 72 formed in the head 36 and placed in communication with a source of suction through a conduit 74 and a flexible hose, not shown. In this manner, when a compacted article is grasped between the jaw bars 54, a source of suction is simultaneously connected through the flexible hose, the conduit 74, the manifold 72 and the orifices 70 to the space between the jaw bars 54 in which the compacted article is held. Suction, applied to the compacted article, is maintained until the part pick-up head 20' is displaced by the station positioner 14 to the part discharge station, at which time suction is cut off, thus permitting the compacted article to drop on the conveyor or in an appropriate container when the jaw bars 54 are released. In addition, if so desired, a gentle flow of compressed air may be supplied to the orifices 70 through the conduit 74 and the manifold 72 to gently blow the compacted article onto the conveyor or into an appropriate container by means such as, for example, disclosed in detail in prior U.S. Pat. No. 3,715,796, assigned to the same assignee as the present application.

In addition, a second manifold 76, also disposed in the head portion 36, and connected through a passageway 78 to a conduit 80 projecting on the top of the head portion 36, permits to apply suction from a source of suction through a plurality of orifices 82 open at the bottom surface of one of the blocks 38 proximate to the surface 16 of the table 10. Any powder, dust or other loose particles that may be present on the top surface 10 of the table 10 and in the die cavity is suctioned through the orifices 82, while the pick-up head 28' is displaced arcuately over the table surface 16.

Figure 11:
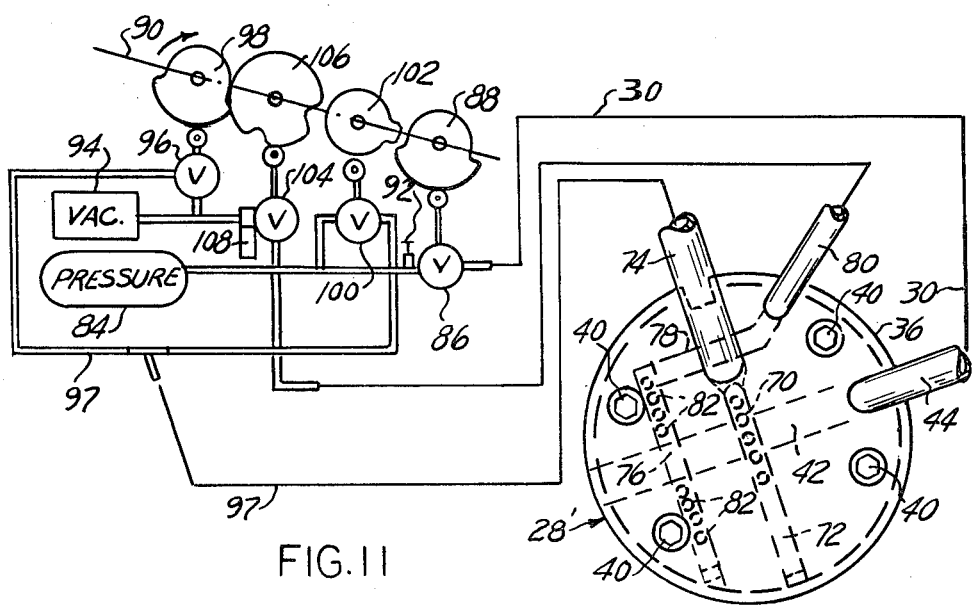
FIG. 11 is a schematic view useful in explaining the operation of the part pick-up head of the invention and modifications thereof.

It will be readily appreciated by those skilled in the art that operation of the mechanical grasping mechanism 56 is effected in appropriate timing sequences by means of appropriate valves operated, for example, by a camshaft driven by the main drive shaft, not shown, of the powder compacting press. FIG. 11 schematically illustrates an example of such an arrangement for controlling the air pressure and flow and the suction sequences for operating the part pick-up head 28 of FIGS. 9-10. The passageway 42 in the pick-up head is connected through the tubular member 44 and the flexible line 30 to a source 84 of pressurized air through a valve 86 operated by a cam 88 keyed on a camshaft 90 driven by the powder compacting press power drive. A lobe on the cam 88 opens the valve 86 at the appropriate time for placing the pressurized air source 84 in communication through the valve 86, the line 30 and the channel 46 with the space in the bore 48 behind the piston rod 50, FIGS. 5-8 and 10, of the part gripping mechanism 56. The compacted article is gripped by the gripping mechanism and held until the valve 86 is caused to close. When the valve 86 closes, the compacted article is released, as previously mentioned, because pressurized air is exhausted from behind the piston rods 50 and is exhausted to the atmosphere via the line 30 by the valve 86 through its exhaust port. An adjustable pressure regulator 92 connected between the source 84 of compressed air and the input of the valve 86 permits to adjust the pressure of the air to a value just sufficient to counterbalance the effect of the jaw return coil springs 68 and to apply on the sidewalls of the compacted article enough pressure to hold it between the jaw members without crushing it.

An aspirator, or source of suction 94, is connected through a valve 96 to the conduit 74, via a line 97, to apply a suction through the orifices 70 to the compacted article grasped by the jaw bars members. The valve 96 is operated by a lobe on a cam 98 mounted on the camshaft 90. The timing of the cam 98 is such that the valve 96 connects the orifices 70 to the source of suction 94 substantially simultaneously with the opening of the valve 86 for applying air pressure behind the piston rod 50 of the mechanical grasping mechanism 56. The source of pressurized air 84 may also be connected to the conduit 74 of the pick-up head, via line 97, through a valve 100 operated by a cam 102 mounted on the camshaft 90. The lobe of the cam 102 and the timing of the camshaft are such that a gentle blast of air is supplied to the orifices 70 for a short period of time, shortly after the valve 96 is closed, thus shutting off suction from the orifices 70, simultaneously with the valve 86 being actuated to exhaust air to the ambient such as to retract the jaw bars 54 of the grasping mechanism 56.

The source of suction 94 is also connected through a valve 104 actuated by a cam 106 to the suction conduit 80 connected, via the passageway 78 and manifold 76, to the suction orifices 82 below the pick-up head. The lobe of the cam 106 is such and the cam 106 is timed such that suction through the orifices 82 is effected during the majority of the travel of the pick-up head back and forth from the article ejection station position to the discharge station position. The cam 106 and the cam actuated valve 104 may be omitted in most compacting operations and the aspirator orifices 82 continuously connected to the source of suction 94. A receptacle is disposed in series in the line conduit, as schematically shown at 108, for collecting dust and powder particles suctioned from the surface 16 of the press table 10 through the orifices 82.

At FIG. 11 the approximate relative timing of the cams 88, 98, 102 and 106 as keyed on the camshaft 90, and the approximate arcuate length and relative timing of the respective cam lobes are illustrated in a manner which, when considered with the following table representing the different steps effected by the powder compacting press during a full 360° revolution of the camshaft 90, provides a better understanding of the timing of the cams, the timed relationship between the operations of the corresponding valves, and the operations effected by the pick-up head of the present invention. Column 1, in the table, represents the angular rotation position of the camshaft 90 from 0° to 360°. The 0° position of the camshaft 90 is assumed to correspond to the die cavity filling step as listed in Column 2. The 120° position of the camshaft corresponds to the article compaction step, the 240° position corresponds to the article ejection step from the die cavity, followed again by the die cavity filling step, corresponding to the 360°, or 0°, position of the camshaft. The arrows, at Column 2 of the table, between consecutive steps indicate travel of the positioner 14 across the surface 16 of the press table 10 to effectuate the steps listed at Column 2. Column 3 indicates the corresponding positions or travels of the pick-up head. Column 4 lists the corresponding actuation of the valve 86 to operate, by air pressure, the article grasping mechanism 56. Columns 5, 6 and 7 apply only to the pick-up head structure illustrated at FIGS. 9–10, and they indicate respectively the operations of the valves 96, 100 and 104 of FIG. 11.

ing means urging said jaw members away from each other upon actuation of said means for exhausting said pressurized fluid from behind said piston members for releasing said article from between said jaw members at said discharge station.

2. The pick-up head of claim 1 further comprising a padding of elastomeric material disposed on each of said jaw members.

3. The pick-up head of claim 1 further comprising at least one guide pin disposed through aligned apertures in said jaw members for maintaining said jaw members in parallel relationship, and wherein said biasing means is in the form of a coil spring disposed around said guide pin between said jaw members.

4. The pick-up head of claim 1 wherein said piston members are each a rod reciprocably disposed in one of said cylinder bores, and said jaw members are each in the form of a bar fastened on the end of said rod.

5. The pick-up head of claim 1 further comprising at least one orifice disposed in said pick-up head above an article being picked at said ejection station, said orifice being momentarily placed in communication with a source of suction during ejection of said article and transfer of said article from said ejection station to said discharge station.

6. The pick-up head of claim 1 further comprising at least one orifice disposed below said pick-up head, and means placing said orifice in communication with a source of suction.

7. A method for transferring an article from the ejection station of an apparatus forming said article to a discharge station, said method comprising disposing a

| 1<br>Angular Position of Camshaft 90 | 2<br>Step | 3<br>Pick-Up Head Position | 4<br>Pick-Up Head Air Pressure Valve 86 | 5<br>Pick-Up Suction Valve 96 | 6<br>Air Blast Valve 100 | 7<br>Vacuum Cleaning Valve 104 |
|---|---|---|---|---|---|---|
| 0° | Fill | Discharge | "on" to "off" | "on" to "off" | "off" to "on" to "off" | "on" to "off" to "on" |
| | ↓↓↓ | Travel from discharge to dwell | "off" | "off" | "off" | "on" |
| 120° | Press | Dwell | "off" | "off" | "off" | "on" |
| | ↓↓↓ | Travel from dwell to eject | "off" | "off" | "off" | "on" |
| 240° | Eject | Over die cavity | "off" to "on" | "off" to "on" | "off" | "off" |
| | ↓↓↓ | Travel from die cavity to discharge | "on" | "on" | "off" | "on" |
| 360° | Fill | Discharge | | | | |

Having thus described the present invention by way of specific examples of structural embodiment thereof, modification whereof will be apparent to those skilled in the art, what is claimed as novel is as follows:

1. A pick-up head for transferring articles from an ejection station to a discharge station, said pick-up head comprising a pair of aligned cylinder bores, a pair of piston members slidably disposed in said bores and reciprocable therein, a pair of jaw members each one connected to one of said piston members for reciprocation therewith, means for simultaneously introducing a pressurized fluid behind each of said piston members for displacing said jaw members towards each other for grasping therebetween an article ejected at said ejection station, means for exhausting said pressurized fluid from behind said piston members after transfer of said article to said discharge station by said pick-up head, and biaspick-up head over said ejection station, ejecting said article into said pick-up head, grasping said article between a pair of fluid pressure actuated reciprocable jaw members disposed in said pick-up head, applying enough pressure upon said article by way of said fluid pressure actuated jaw members for maintaining said article securely between said jaw members, limiting the pressure applied upon said article to what is required for holding the article without crushing it, displacing said pick-up head from said ejection station to said discharge station, and releasing said fluid pressure actuating said jaw members for allowing said jaw members to spread apart for gravity discharging said article at said discharge station.

8. The method of claim 7 further comprising applying a suction on said article while grasped between said jaw members, said suction tending to apply said article against a surface disposed above said jaw members, and releasing said suction simultaneously with spreading said jaw members apart at said discharge station.

9. The method of claim 8 further comprising applying a gentle blast of air upon said article upon releasing said jaw members at said discharge station.

10. The method of claim 7 further comprising applying suction through at least one orifice disposed below said pick-up head at least while said pick-up head is displaced from said ejection station to said discharge station.

11. The method of claim 8 further comprising applying suction through at least one orifice disposed below said pick-up head at least while said pick-up head is displaced from said ejection station to said discharge station.

12. The method of claim 9 further comprising applying suction through at least one orifice disposed below said pick-up head at least while said pick-up head is displaced from said ejection station to said discharge station.

* * * * *